Aug. 26, 1924.
L. CLEMENT
1,506,110
SAFETY CLUTCH RELEASE
Filed Aug. 4, 1923    3 Sheets-Sheet 1
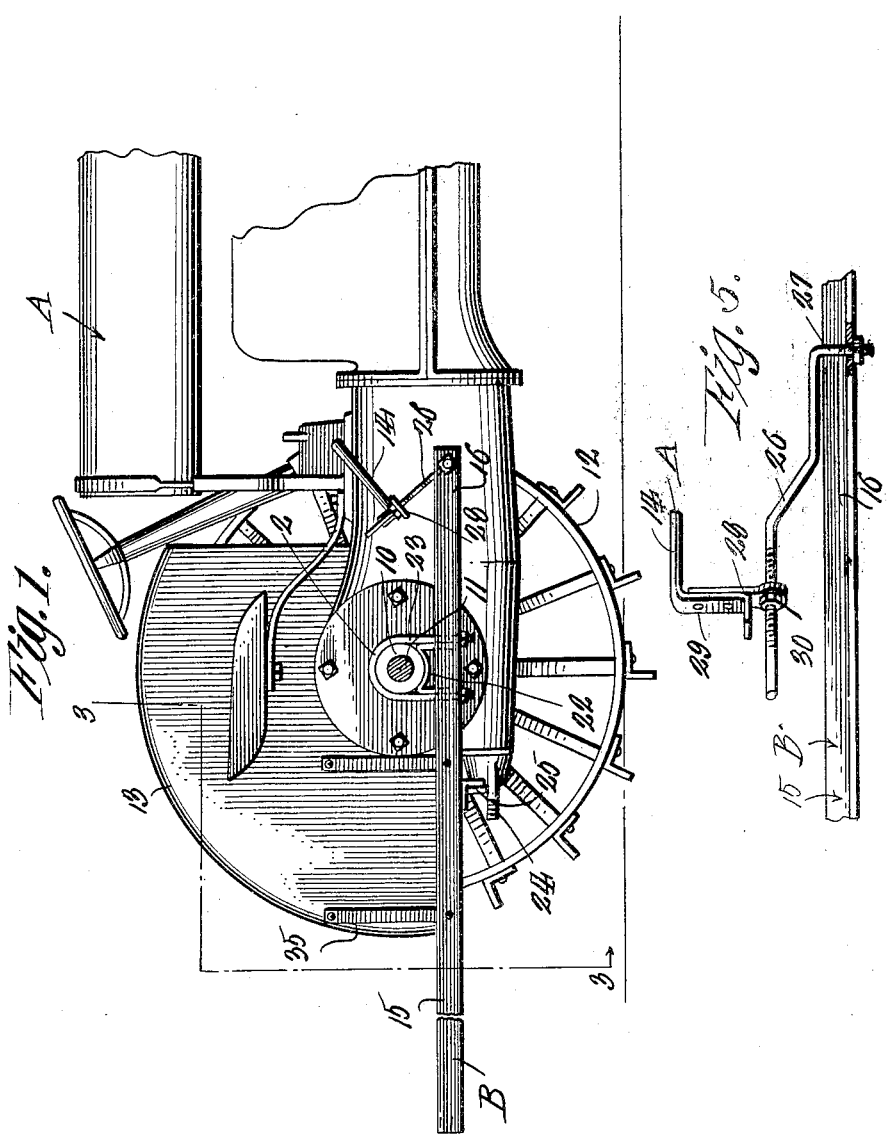
WITNESSES
Guy M Spring
George H Wright
Inventor
LOUIS CLEMENT
By Richard B Owen
Attorney

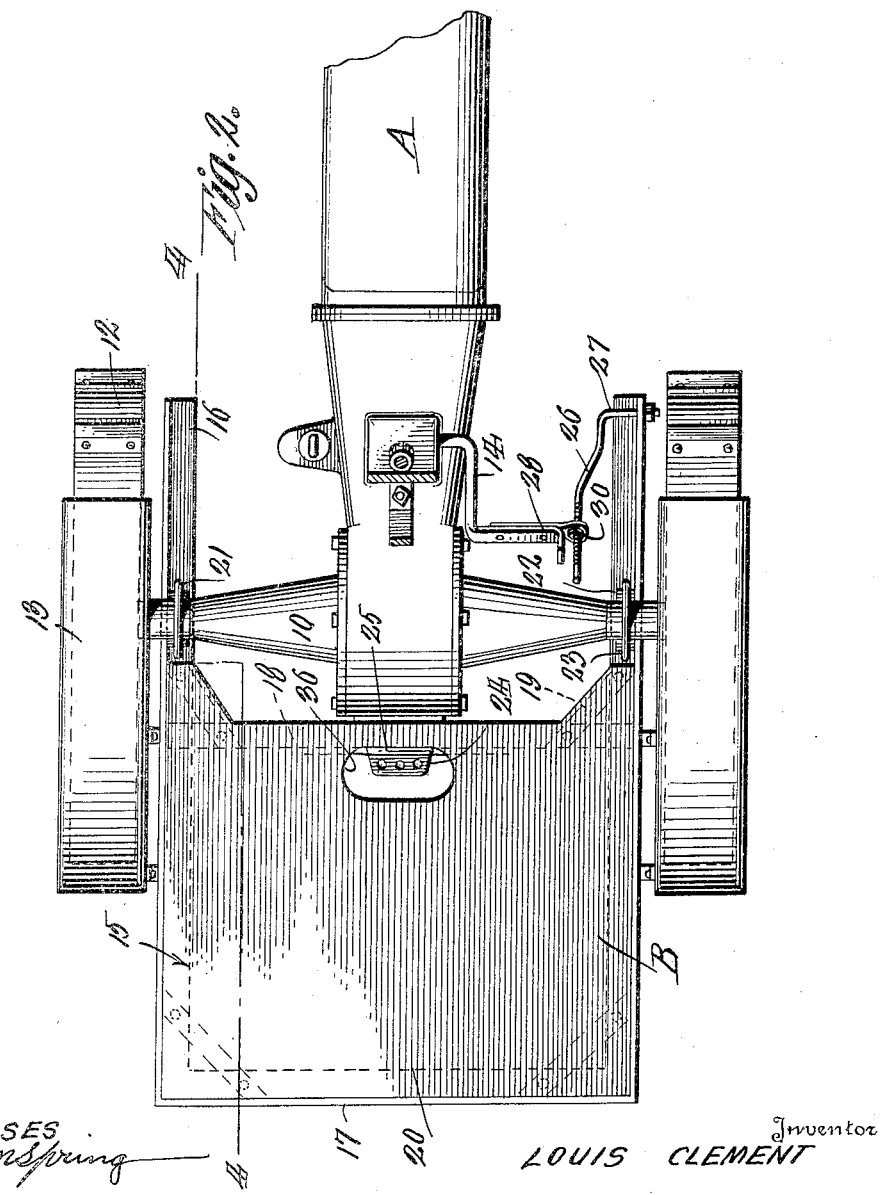

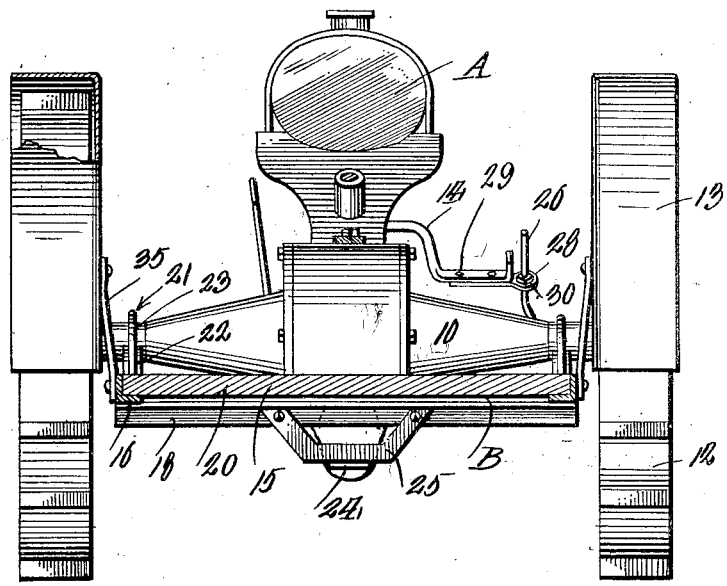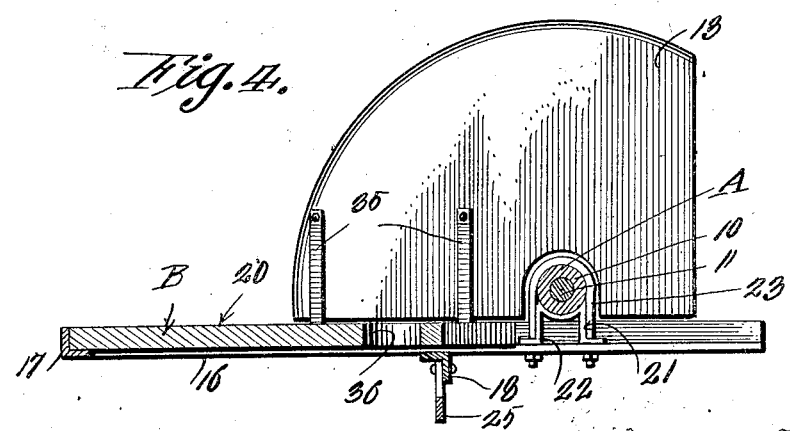

Patented Aug. 26, 1924.

1,506,110

UNITED STATES PATENT OFFICE.

LOUIS CLEMENT, OF EVANGELINE, LOUISIANA.

SAFETY CLUTCH RELEASE.

Application filed August 4, 1923. Serial No. 655,711.

*To all whom it may concern:*

Be it known that I, LOUIS CLEMENT, a citizen of the United States, residing at Evangeline, in the parish of Acadia and State of Louisiana, have invented certain new and useful Improvements in a Safety Clutch Release, of which the following is a specification.

This invention appertains to attachments for farm tractors and the like and the primary object of this invention is to provide means for rendering a tractor safe to handle without danger to the operator of the machine.

In a well known make of tractor, the same, when in use and under heavy load has a tendency to rear backward and turn over. The tendency of the tractor to rear backward and turn over has caused a number of serious accidents and places an element of danger in the operation thereof.

It is therefore another prime object of this invention to provide an attachment for farm tractors, which will effectively prevent a tractor from turning over backward and injuring the operator thereof.

A further prime object of the invention is to provide novel means for throwing out the clutch of the tractor, when the same rears backward to a predetermined angle, thereby stopping the operation of the tractor and the preventing of the same from turning over or inclining backward to a dangerous degree.

A further object of the invention is the provision of a novel platform and frame work carried by the rear end of the tractor and pivotally associated with the rear drive axle housing, the platform and frame work being adapted to come into engagement with the ground when the tractor rears backward to a predetermined degree, the platform and frame work having a novel connection with the clutch of the tractor for throwing the clutch out, when the platform or frame work comes into engagement with the ground.

A still further object of the invention is to provide an improved device of the above character, which will be durable and efficient in use, one that will be simple and easy to manufacture and one which can be placed upon the market and incorporated with the tractor at a reasonable cost.

With these and other objects in view, the invention consists in the novel construction, arrangement and formation of parts, as will be hereinafter more specifically described, claimed and illustrated in the accompanying drawings, in which drawings:

Figure 1 is a fragmentary side elevation of a tractor with the rear drive axle thereof shown in section and with the improved safety appliance incorporated therewith.

Figure 2 is a fragmentary plan view of a tractor with parts thereof in section illustrating the improved safety appliance incorporated therewith.

Figure 3 is a rear elevation of the tractor with parts thereof in section with the improved safety appliance incorporated therewith, the appliance being shown in transverse vertical section.

Figure 4 is a longitudinal section taken on the line 4—4 of Figure 2.

Figure 5 is a detail view illustrating the novel connection between the operating platform and the clutch pedal.

Referring to the drawings in detail, wherein similar reference characters designate corresponding parts throughout the several views, the letter A generally indicates a well known make of tractor and B the improved safety appliance therefor.

As stated, the tractor A is of a well known type, and a detailed description thereof will therefore not be given, and as shown, the same includes the rear drive axle housing 10 for the drive axle 11, which carries the rear drive or bull wheels 12. As shown fenders 13 are provided for the wheels 12, and the tractor is provided with the ordinary clutch pedal 14.

The improved attachment B consists essentially of a platform 15 including longitudinally extending side channel or angle beams 16 connected at their rear ends by a transverse channel or angle beam 17 and at a point intermediate their ends by a transverse channel or angle beam 18. These beams 16, 17 and 18 are suitably braced in any preferred way such as by strap irons or the like 19. A bed or floor 20 is arranged upon the channel beams 16 and this bed or floor extends from the rear beam 17 to the front transverse beam 18.

The forward terminals of the longitudinal beams 16 extend under the rear axle housing 10 and the bed or floor 20 is disposed in close proximity to the rear axle housing and the differential casing and the forward edge of this bed or floor is shaped so as to snugly receive the same.

Suitable clamps 21 are carried by the beams 16 in order to receive the housing 10 and these clamps 21 rockably support the platform. As shown the clamps 21 consist of lower U-shaped supporting members 22 upon which the axle housing 10 rests and an upper U-shaped member 23, which extends around the axle housing. The terminals of these members 22 and 23 extend through the beams 16 and are connected therewith by suitable nuts or the like.

In order to prevent the twisting back of the platform 15 a depending strap 25 is provided, which rests upon the draw bar 24 of the tractor.

It is obvious that when the tractor A through any cause tilts backward, that the rear end of the platform 15 will come into engagement with the ground, and thus tend to rock the platform on the axle housing 10.

In order to bring about the stopping of the tractor, means is provided for connecting the forward end of the platform with the clutch pedal 14 so as to automatically throw out the clutch when the rear end of the platform 15 comes into engagement with the ground. This is accomplished by the provision of a rod 26, which is provided with an inwardly extending arm 27, that is rotatably connected with the forward end of one of the beams 16. This rod 26 slidably receives a strap 28, which is riveted as at 29 to the clutch pedal 14. The strap 28 normally rests against a stop 30, which can be threaded upon the rod 26.

Now it can be seen that when the tractor tilts rearwardly and the rear end of the platform 15 comes into engagement with the ground, that the forward end of the platform will be swung downward and the stop 30 will be moved into engagement with the strap 28 and thus bear down on the clutch pedal 14 and automatically disengage the clutch, which will bring about the automatic stopping of the tractor.

If so desired the fenders 13 can be connected by suitable metal straps 35 with the side beams 16 of the platform 15.

From the foregoing description, it can be seen that I have provided an exceptionally simple safety appliance for tractors, which will effectively prevent the tilting back thereof to a dangerous angle.

In order to permit the convenient attaching of farm implements and the like to the tractor, the bed or floor 20 is provided with a cutout portion 36 directly above the draw bar 24, which will allow convenient access to be had to the said draw bar.

Changes in details may be made without departing from the spirit or the scope of this invention, but what I claim as new is:

1. The combination with a tractor including a clutch pedal, of a safety appliance for the tractor for preventing the tilting back of the tractor to a dangerous angle comprising a platform, means rockably securing the platform at a point intermediate its ends to the rear drive axle casing of the tractor, the rear end of the platform extending beyond the rear end of the tractor, an operating rod rockably carried by the forward end of the platform, means slidably connecting the rod with the clutch pedal, and a stop carried by the rod for engaging said clutch pedal.

2. The combination with a tractor including a clutch pedal and a rear drive axle housing, of a safety appliance for the tractor for preventing the same from tilting back to a dangerous angle including a platform having longitudinally extending side beams, transversely extending connecting beams, clamps carried by the side beams at a point intermediate their ends for engaging said axle housing for rockably supporting the platform, the rear end of the platform extending beyond the rear end of the tractor for engaging the ground, when the tractor tilts backward to a predetermined angle, a rod rockably supported by the forward end of one of said side beams, a strap secured to the clutch pedal slidably receiving said rod, and a stop adjustably carried by the rod for engaging the upper surface of the strap.

3. The combination with a tractor including a rear drive axle, casing for the rear drive axle, bull wheels connected with the outer ends of the drive axle, and a clutch pedal, of a safety appliance for the tractor comprising a platform including longitudinally extending side beams, connecting cross beams, and a bed secured to the platform adjacent to the rear end thereof, adjustable clamps carried by the side beams at a point intermediate their ends for engaging the casing for rockably supporting the platform, wheel fenders secured to the platform, the platform extending beyond the rear end of the tractor for engaging the ground, when the tractor tilts rearward to a predetermined angle, and means operatively connecting the forward end of the platform with the clutch pedal.

In testimony whereof I affix my signature in presence of two witnesses.

LOUIS CLEMENT.

Witnesses:
DON L. CLEMENT,
LAURENT CLEMENT.